(12) United States Patent
Oohira

(10) Patent No.: US 8,259,252 B2
(45) Date of Patent: Sep. 4, 2012

(54) LIQUID CRYSTAL DISPLAY DEVICE

(75) Inventor: Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 140 days.

(21) Appl. No.: 12/729,638

(22) Filed: Mar. 23, 2010

(65) Prior Publication Data

US 2010/0245706 A1 Sep. 30, 2010

(30) Foreign Application Priority Data

Mar. 24, 2009 (JP) ................................ 2009-071605

(51) Int. Cl.
*G02F 1/1333* (2006.01)

(52) U.S. Cl. ......................................................... 349/58

(58) Field of Classification Search ................ 349/58, 349/60
See application file for complete search history.

(56) References Cited

U.S. PATENT DOCUMENTS 8,060,168 B2 * 11/2011 Horrdin et al. ............. 455/575.8
2009/0128733 A1 * 5/2009 Teramoto ........................ 349/60

FOREIGN PATENT DOCUMENTS

JP 11-174417 7/1999
JP 2008-083491 4/2008

* cited by examiner

*Primary Examiner* — Sarah Hahm

(74) *Attorney, Agent, or Firm* — Antonelli, Terry, Stout & Kraus, LLP.

(57) ABSTRACT

In a thin liquid crystal display device having a front window, a cushion material is interposed between a liquid crystal display panel and a mold in which a backlight is housed. When an external force is applied to the front window, the cushion material helps to avoid concentration of stress on a TFT substrate constituting the liquid crystal display panel. Thus, it is possible to prevent the TFT substrate from being cracked. Further, a peripheral wall portion is formed in the mold and is bonded to the front window, in order to prevent the phenomenon that the liquid crystal display panel is removed from the front window when an excess force is applied to a transparent adhesive material that bonds the front window and the liquid crystal display panel together.

6 Claims, 10 Drawing Sheets

A—A

US 8,259,252 B2

LIQUID CRYSTAL DISPLAY DEVICE

CLAIM OF PRIORITY

The present application claims priority from Japanese Patent Application JP 2009-071605 filed on Mar. 24, 2009, the content of which is hereby incorporated by reference into this application.

FIELD OF THE INVENTION

The present invention relates to a liquid crystal display device, and more particularly to a technology for preventing a crack of a glass substrate in a thin liquid crystal display device having a front window, a touch panel, and the like.

BACKGROUND OF THE INVENTION

A liquid crystal display device has two substrates. One is a TFT substrate in which pixel electrodes, thin film transistors (TFTs), and the like are formed in a matrix form. The other is a counter substrate disposed opposite to the TFT substrate, in which color filters and the like are formed at positions corresponding to the pixel electrodes of the TFT substrate. A liquid crystal is interposed between the TFT substrate and the counter substrate. Thus, the liquid crystal display device forms an image by controlling the transmittance of light of the liquid crystal molecules for each pixel.

Along with the demand for reducing the overall size of the liquid crystal display device as a set, there is also a strong demand for reducing the thickness of a liquid crystal display panel of the liquid crystal display device, while the size of the screen remains unchanged. A thin liquid crystal display panel is obtained in such a way that a liquid crystal display panel is produced, and then the outside of the liquid crystal display device is polished to a desired thickness.

The TFT substrate including pixel electrodes, TFTs, and the like, and the counter substrate including color filters, are glass substrates constituting the liquid crystal display device. The two glass substrates are standardized, for example, at a thickness of 0.5 mm or 0.7 mm. It is difficult to obtain such standardized glass substrates from the market. Further, very thin glass substrates have a problem in the production process in terms of mechanical strength and bending or deformation, which reduces the production yield. As a result, a liquid crystal display panel is formed from the standardized glass substrates, and then the outside of the formed liquid crystal display panel is polished to a desired thickness.

When the thickness of the liquid crystal display panel is reduced, the problem of the mechanical strength arises. There is a risk that when a mechanical pressure is applied to a surface of the liquid crystal display panel, the liquid crystal display panel will be destroyed. In order to prevent this, a front window is attached to the screen side of the liquid crystal display panel when the liquid crystal display panel is set into a mobile phone and the like.

The front window may be provided at a distance from the liquid crystal display panel so that the external force applied to the front window has no influence on the liquid crystal display panel. However, such a configuration has a problem that reflection occurs in the interface of the front window, reducing the quality of the image.

In order to solve this problem, for example, JP-A No. 174417/1999 describes a technology in which an adhesive elastomer is interposed between the front window and the liquid crystal display panel. The adhesive elastomer helps not only to protect the liquid crystal display panel from the external force but also to prevent the reflection in the interface of the front window by setting the refractive index of the adhesive elastomer to a value close to the refractive index of the front window.

The liquid crystal display device can have a small size and a reduced thickness, allowing it to be used in various types of applications such as mobile phones. Recently, mobile phones are provided with various applications. Further, input devices are expected to have a function that allows finger input through a touch panel, in addition to the conventional key button operation. In this case, the touch panel is attached to the side of the counter substrate of the liquid crystal display panel.

Even in the liquid crystal display device of such a configuration, the demand for a reduction in the thickness of the liquid crystal display panel still exists. Also the thickness of the touch panel provided on the liquid crystal display panel is expected to be reduced. Thus, even if the touch panel is present, the problem of the mechanical strength of the liquid crystal display panel still remains.

In order to solve such a problem, a window formed from glass or resin is mounted on the upper side of the touch panel. In this case also, when an air layer is present between the liquid crystal display panel and the touch panel, or between the touch panel and the front window, the quality of the image is reduced by the interface reflection. In order to prevent this, JP-A No. 83491/2008 describes a configuration in which an adhesive layer or anti-reflection coating is formed between the liquid crystal display panel and the touch panel, or between the touch panel and the front window.

A liquid crystal display panel can be protected from an external force by providing a front window. However, the strength of the liquid crystal display panel is very different depending on the position of the liquid crystal display panel. In other words, the liquid crystal display panel is formed in such a way that a TFT substrate and a counter substrate are bonded at a peripheral portion thereof by a seal material, with a liquid crystal interposed between the TFT substrate and the counter substrate. The TFT substrate is formed larger than the counter substrate. A terminal portion is formed in the portion of the TFT substrate extending further than the counter substrate, to which an IC driver is mounted and a flexible wiring substrate is attached. Further, an upper polarization plate is bonded to the upper side of the counter substrate while a lower polarization plate is bonded to the lower side of the TFT substrate, which is provided corresponding to the portion to which the upper polarization plate is bonded.

In order to meet the demand for reduction in the thickness of the liquid crystal display panel, the TFT substrate and the counter substrate are polished to a thickness of about 0.15 mm. Each of the upper and lower polarization plates has a thickness of about 0.13 mm. The polarization plate is formed from a resin which is stronger than the glass. Thus, the strength of the portion in which the counter substrate and the TFT substrate are bonded to each other is equivalent to the total thickness of the two glasses and the two polarizations. In contrast, the thickness of the portion of only the TFT substrate is 0.15 mm. Thus, the strength of the portion of only the TFT substrate is one fourth or less of the strength of the portion in which the TFT substrate and the counter substrate are bonded to each other.

Because the liquid crystal display panel has such a configuration, when an external force is applied to the liquid crystal display panel, the stress is concentrated in the portion of only the TFT substrate, in particular at the boundary between the area in which the TFT substrate and the counter substrate overlap with each other and the area of only the TFT substrate. As a result, a crack occurs in the TFT substrate at the boundary region. This problem is encountered both during and after production process of the liquid crystal display panel.

SUMMARY OF THE INVENTION

The present invention aims to solve the above problem and to provide a thin liquid crystal display panel with high reliability.

The present invention is made to solve the above problem. The detailed configurations are as follows:

(1) A liquid crystal display device includes a mold in which a backlight is housed, a liquid crystal display panel provided on the mold, a front window bonded on the liquid crystal display panel, and a housing in which the front window, the liquid crystal display panel, and the mold are provided. The front window is bonded to the housing. The mold has a peripheral wall portion that is bonded to the front window. A cushion material is interposed between the liquid crystal display panel and the mold. The liquid crystal display panel and the mold are not bonded to each other.

(2) In the liquid crystal display device described in paragraph (1), the cushion material is a one-side adhesive tape.

(3) A liquid crystal display device includes a mold in which a backlight is housed, a liquid crystal display panel provided on the mold, a front window bonded on the liquid crystal display panel, and a housing in which the front window, the liquid crystal display panel, and the mold are provided. The front window is bonded to the housing. The mold has a peripheral wall portion that is bonded to the front window. A space is formed between the liquid crystal display panel and the mold.

(4) A liquid crystal display device includes a mold in which a backlight is housed, a liquid crystal display panel provided on the mold, a touch panel bonded on the liquid crystal display panel, a front window bonded on the touch panel, and a housing in which the front window, the liquid crystal display panel, and the mold are provided. The front window is bonded to the housing. The mold has a peripheral wall portion that is bonded to the front window. A cushion material is interposed between the liquid crystal display panel and the mold. The liquid crystal display panel and the mold are not bonded to each other.

(5) In the liquid crystal display device described in paragraph (4), the cushion material is a one-side adhesive tape.

(6) A liquid crystal display device includes a mold in which a backlight is housed, a liquid crystal display panel provided on the mold, a touch panel bonded on the liquid crystal display panel, a front window bonded on the touch panel, and a housing in which the front window, the liquid crystal display panel, and the mold are provided. The front window is bonded to the housing. The mold has a peripheral wall portion that is bonded to the front window. A space is formed between the liquid crystal display panel and the mold.

According to the present invention, a housing includes a mold in which a backlight is housed, a liquid crystal display panel provided on the mold, and a front window bonded on the liquid display panel, in which a cushion material is interposed between the mold and the liquid crystal display panel. Thus, even if an external force is applied to the front window, the stress is unlikely to be concentrated in a specific portion of the liquid crystal display panel. As a result, it is possible to reduce the risk of destroying the liquid crystal display panel.

Further, according to the present invention, the mold has a peripheral wall portion that is bonded to the front window by an adhesive material to support the mold itself. Thus, a transparent adhesive material interposed between the liquid crystal display panel and the front window can only support the liquid crystal display panel. As a result, it is possible to reduce the risk of peeling of the transparent adhesive material.

This is the same in the case of forming the space between the mold and the liquid crystal display panel, instead of using the cushion material. Also in the case in which the touch panel is interposed between the liquid crystal display panel and the front window, the same effect can be obtained with the configuration described above.

DETAILED DESCRIPTION OF THE PREFERRED EMBODIMENTS

Details of the present invention will be disclosed in accordance with the embodiments.

First Embodiment

Figure 1:
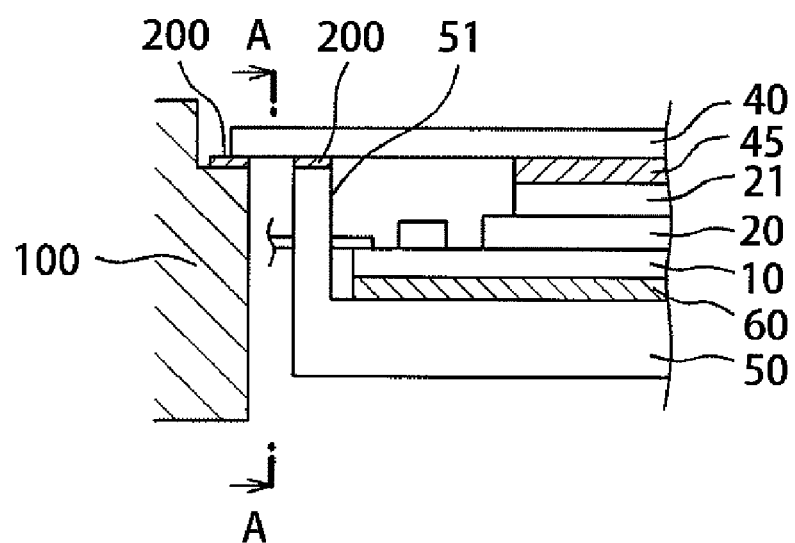
FIG. 1 is a partial cross-sectional view of the long side of a liquid crystal display device according to a first embodiment.
Figure 2:
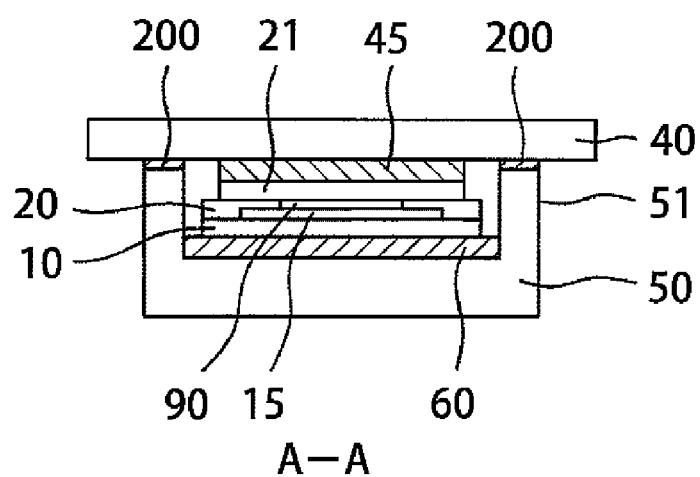
FIG. 2 is a cross-sectional view of the short side of the liquid crystal display device according to the first embodiment.

The feature of the present invention is, as shown in FIG. 1 or 2, in the configuration of the relationship among a liquid crystal display panel, the shape of a mold 50 in which a backlight is housed, and a housing 100 for housing the liquid display panel and the mold 50. Before describing FIGS. 1 and 2 showing the feature of the present invention, a liquid crystal display device to which the present invention is applied will be explained.

Figure 3:
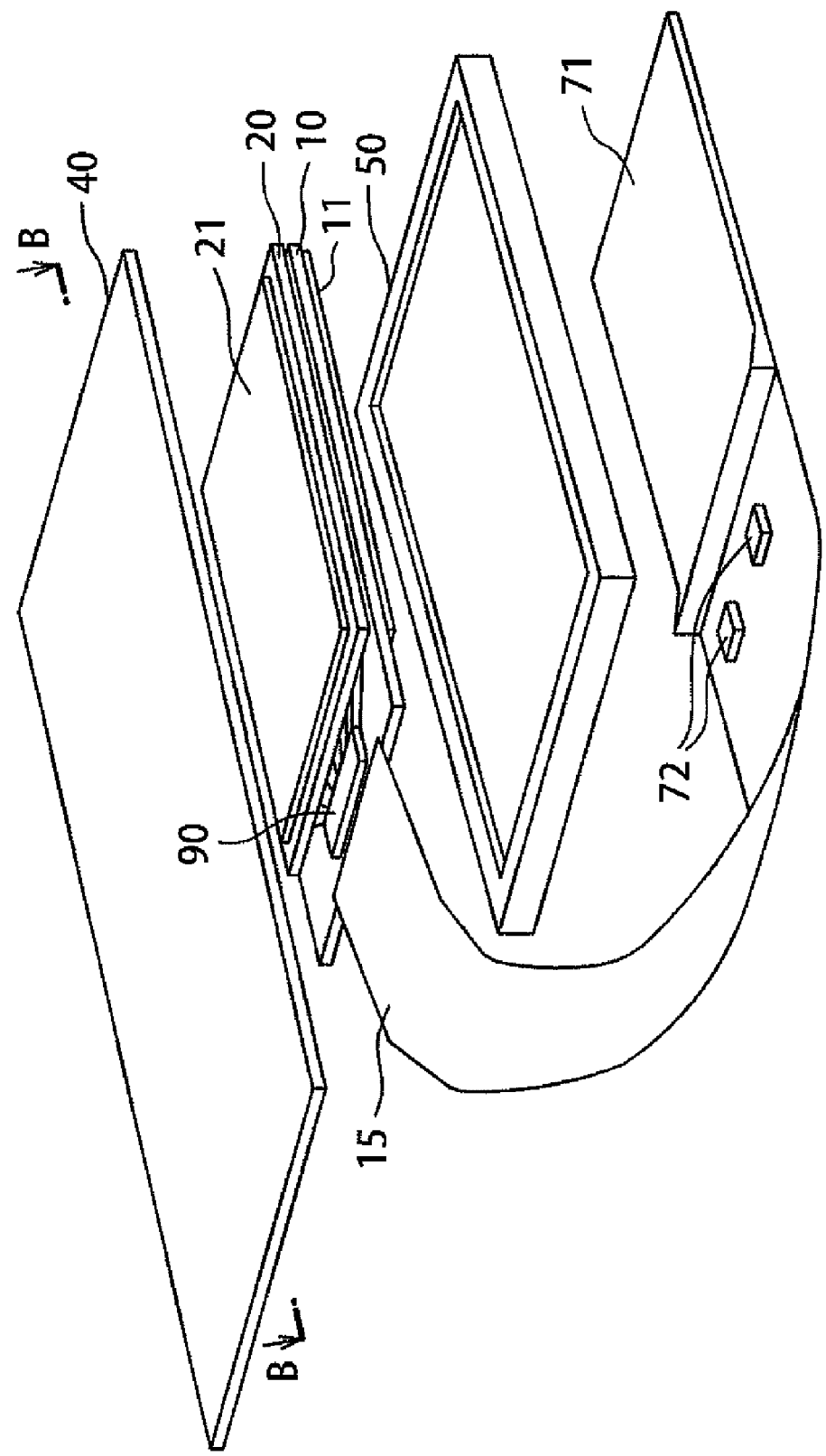
FIG. 3 is an exploded perspective view of the liquid crystal display device to which the first embodiment is applied.
Figure 4:
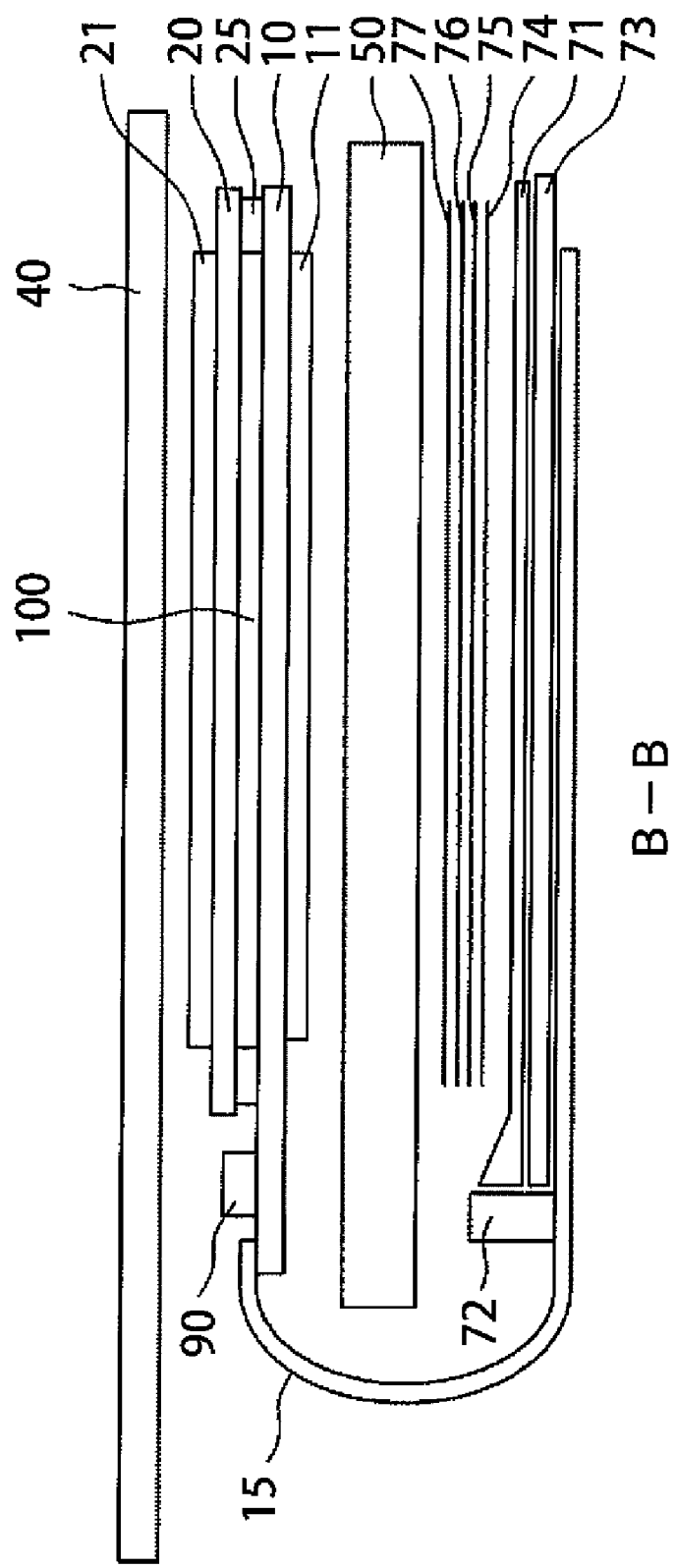
FIG. 4 is another exploded perspective view of the liquid crystal display device to which the first embodiment is applied.

FIG. 3 is an exploded perspective view of a liquid crystal display device to which a first embodiment is applied. FIG. 4 is an exploded cross-sectional view along the line B-B in FIG. 3. In FIG. 3, the liquid crystal display panel includes a TFT substrate 10, a counter substrate 20, an upper polarization plate 21, and a lower polarization plate 11. The TFT substrate 10 has pixels formed in a matrix form, in which a thin film transistor is formed in each pixel to switch a signal. On the opposite side of the TFT substrate 10, the counter substrate 20 is provided in which color filters are formed.

Each of the TFT substrate 10 and the counter substrate 20, which are glass substrates, is produced with a thickness of 0.5 mm. Then, the liquid crystal is sealed between the two glass substrates. After completion of a liquid crystal display panel, the outside of the liquid crystal display panel is polished to reduce the thickness of the entire liquid crystal display panel. In this embodiment, the thickness of each of the TFT substrate 10 and the counter substrate 20 after polish is 0.15 mm.

The TFT substrate 10 is formed larger than the counter substrate 20. A driver IC 90 and a flexible wiring substrate 15 are attached to a portion of only the TFT substrate 10. The liquid crystal display panel is placed on a resin mold 50. In the liquid crystal display panel, the upper polarization plate 21 and the lower polarization plate 11 (not shown) are bonded to a portion in which the TFT substrate 10 and the counter substrate 20 overlap with each other. For this reason, the mechanical strength in the overlapping portion of the TFT substrate 10 and the counter substrate 20 is much greater than in the portion of only the TFT substrate 10.

There is shown the backlight below the mold 50. The backlight is disposed within the mold. FIG. 3 only shows a light guide panel 71 of the backlight. The flexible wiring substrate 15 is folded to the back side of the mold 50 and is mounted to the bottom of the backlight. A light emitting diode (LED) 72, which is a light source of the backlight, is attached to the flexible wiring substrate 15. The LED 72 is provided on a side surface of the light guide panel 71. In addition to the LED 72, the flexible wiring substrate 15 also has wiring for a power supply for driving the liquid crystal display panel, as well as wiring for scan lines, data signal lines, and the like.

In FIG. 3, a front window 40 is provided on the upper polarization plate 21. The front window 40 is formed from a transparent resin such as acrylic or polycarbonate, and has a thickness of 0.5 mm to 0.8 mm. The front window 40 is bonded to the upper polarization plate 21 by a transparent adhesive layer 45. The front window 40 is formed so as to cover the entire liquid crystal display panel.

FIG. 4 is a cross-sectional view along the line B-B in FIG. 3, which is an exploded cross-sectional view. Actually, the liquid crystal display panel is placed on the mold 50 in which the backlight is housed. The front window 40 is bonded to the liquid crystal display panel. In FIG. 4, the TFT substrate 10 and the counter substrate 20 are separated from each other by a distance of several microns. A liquid crystal is inserted into the space between the TFT substrate 10 and the counter substrate 20. A seal material 25 is provided around the periphery of the TFT substrate 10 and the counter substrate 20, to seal the liquid crystal between the substrates.

The TFT substrate 10 includes not only the pixel electrodes and the TFTs but also wiring such as scan lines and data signal lines. These lines extend through the seal material 25 to the outside, and are connected to the driver IC 90 or the flexible wiring substrate 15. The flexible wiring substrate 15 extends to the back of the backlight. The LED 72 of the flexible wiring substrate 15 is provided on the side surface of the light guide panel 71, to serve as the light source of the backlight. Plural units of the LED 72 are provided.

In FIG. 4, the light guide panel 71 has a function of directing the light from the LED 72 provided on the side surface of the light guide panel 71, toward the liquid crystal display panel. A reflection sheet 73 directs the light emitted downward from the light guide panel 71, toward the liquid crystal display panel. A lower diffusion sheet 74 is provided on the light guide panel 71. Plural LEDs 72 are provided on the side surface of the light guide panel 71 at a distance from one another. Thus, the light emitted upward from the light guide panel 71 is not uniform. In other words, the closer the light to the LEDs 72, the brighter the light. The lower diffusion sheet 74 has a function of equalizing the light emitted upward from the light guide panel 71.

A lower prism sheet 75 is placed on the lower diffusion sheet 74. The lower prism sheet 75 is configured such that a large number of prisms extending in the horizontal direction of the screen are formed at predetermined pitches, for example, at intervals of about 50 μm. In this way, the light emitted from the light guide panel 71 toward the longitudinal direction of the screen is focused on the vertical direction of the screen of the liquid crystal display panel. An upper prism sheet 76 is placed on the lower prism sheet 75. The upper prism sheet 76 is configured such that a large number of prisms extending in the longitudinal direction of the screen are formed in the vertical direction to the lower prism sheet 75 at predetermined pitches, for example, at intervals of about 50 μm. In this way, the light emitted from the light guide panel 71 toward the horizontal direction of the screen is focused on the vertical direction of the screen of the liquid crystal display panel. As described above, the light emitted in the longitudinal and horizontal directions can be focused on the vertical direction of the screen by means of the lower prism sheet 75 and the upper prism sheet 76. In other words, the use of the lower prism sheet 75 and the upper prism sheet 76 can improve the front brightness.

An upper diffusion sheet 77 is placed on the upper prism sheet 76. Each of the prism sheets has prisms extending in the specific direction, for example, at a pitch of 50 μm. In other words, stripes of brightness and darkness are formed at a pitch of 50 μm. Meanwhile, the liquid crystal display panel has scan lines formed in the horizontal direction of the screen at a predetermined pitch, or data signal lines formed in the longitudinal direction of the screen at a predetermined pitch. As a result, interference occurs between the scan lines and the lower prism sheet 75, or between the data signal lines and the upper prism sheet 76, causing an occurrence of moiré. The upper diffusion sheet 77 has a function of reducing the moiré by means of its diffusion effect. Note that the upper prism sheet 76 may be used as a sheet with the diffusion effect, without separately providing the upper diffusion sheet 77.

The light from the upper diffusion sheet is incident to the lower polarization plate 11, and is polarized by the lower polarization plate 11. The transmittance of the polarized light is controlled by the liquid crystal for each pixel within the liquid crystal display panel, and then an image is formed. The light output from the liquid crystal display panel is polarized again by the upper polarization plate 21, and then is recognized by human eyes.

The front window 40 is placed on the upper polarization plate 21. The front window 40 according to the present invention is formed from a transparent resin. The front window 40 is bonded to the upper polarization plate 21 by the transparent adhesive layer 45.

Figure 5:
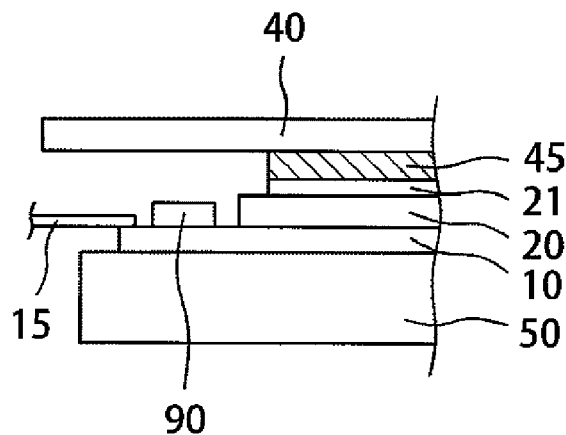
FIG. 5 is a partial cross-sectional view of the long side of the liquid crystal display device to which the first embodiment is applied.

FIG. 5 is a partial cross-sectional view in the long axis direction of the assembled liquid crystal display device shown in FIG. 4. In FIG. 5, the components of the backlight, such as the LEDs 72, the light guide panel 71, the prism sheets, and the diffusion sheets, are housed in the mold 50. The liquid crystal display panel is placed on the mold 50.

In FIG. 5, the front window 40 is placed on the upper polarization plate 21 of the liquid crystal display panel with the transparent adhesive layer 45 interposed therebetween. The front window 40 is formed so as to cover the entire mold 50. In FIG. 5, the lower polarization plate 11 is housed in the mold 50.

Figure 6:
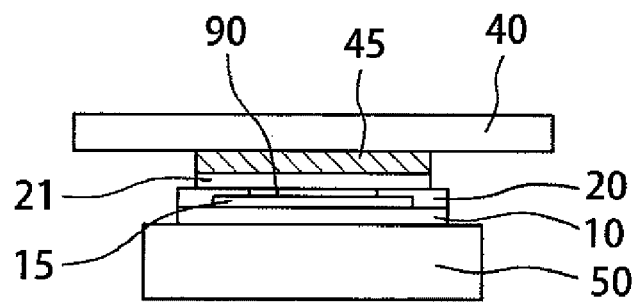
FIG. 6 is a cross-sectional view of the short side of the liquid crystal display device to which the first embodiment is applied.

FIG. 6 is a side view in the short side direction of the assembled liquid crystal display device shown in FIG. 4. In FIG. 6, the components of the backlight, such as the LEDs 72, the light guide panel 71, the prism sheets, and the diffusion sheets, are housed in the mold 50. The liquid crystal display panel is placed on the mold 50, in which the flexible wiring substrate 15 and the driver IC 90 are shown on the TFT substrate 10. The front window 40 is placed on the upper polarization plate 21 with the transparent adhesive layer 45 interposed therebetween.

Figure 7:
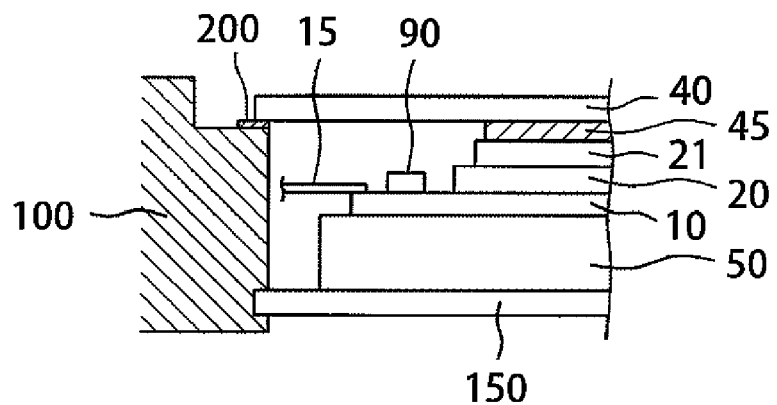
FIG. 7 is a cross-sectional view of a conventional example showing the state in which a liquid crystal display device is housed in a housing.

FIG. 7 is a partial cross-sectional view of a state in which the liquid crystal display panel, the backlight, and the other components are housed in the housing 100. In FIG. 7, the front window 40 is bonded to a step portion of the housing 100. Further, the mold 50 in which the backlight is housed is placed on a lower frame 150 integrally formed with the housing 100.

The mold 50 is only placed on the lower frame 150 and is not bonded to the lower frame 150. This is to prevent stress occurring in plural bonded portions, because the front window 40 and the housing 100 are bonded to each other. The liquid crystal display panel and the other components placed on the mold 50 are the same as those described with reference to FIGS. 5 and 6. However, the upper polarization plate 21 is omitted in FIG. 7.

Figure 8:
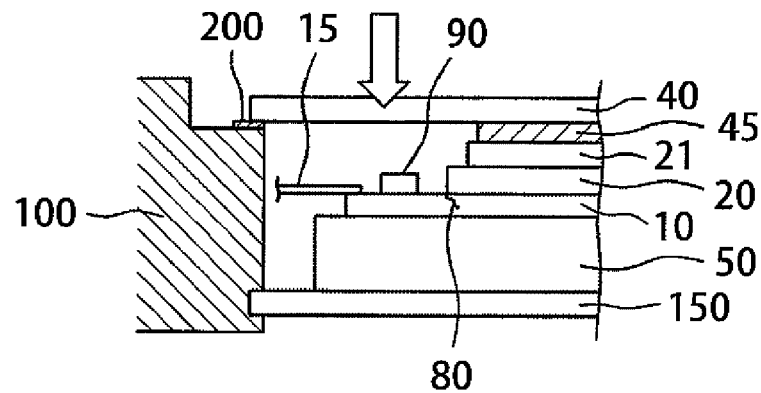
FIG. 8 is a cross-sectional view showing a problem of FIG. 7.

FIG. 8 is a partial cross-sectional view showing a problem in the configuration of FIG. 7. FIG. 8 shows a state in which an external force indicated by the white arrow is applied to a portion of the front window 40. When the external force is applied to the front window 40, the liquid crystal display panel is pushed down. However, because of the lower frame 150 present on the lower side, the mold 50 does not move further down than the lower frame 150. As a result, the stress is applied to the liquid crystal display panel.

At this time, as described above, the strength is very different between the portion of only the TFT substrate 10 and the portion in which the TFT substrate 10 is bonded the counter substrate 20. The stress is concentrated at the boundary between the portion of only the TFT substrate 10, and the portion in which the counter substrate 20 and the TFT substrate 10 overlap with each other. As a result, as shown in FIG. 8, a crack 80 is generated in the TFT substrate 10 at the boundary region, causing the liquid crystal display device to be defective.

Figure 9:
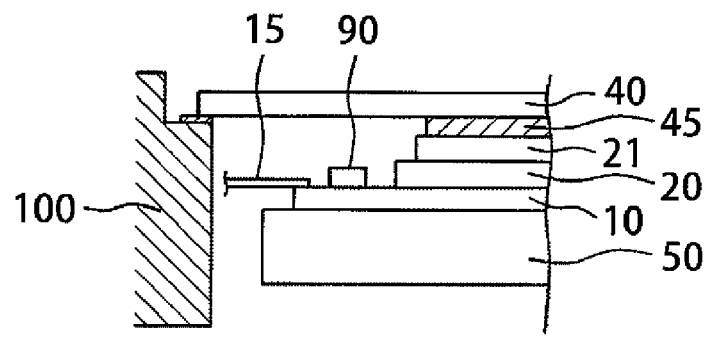
FIG. 9 is a cross-sectional view of another conventional example showing the state in which the liquid crystal display device is housed in the housing.

FIG. 9 is a partial cross-sectional view of a state in which the lower frame 150 of the housing 100 is removed in order to solve the problem of the crack shown in FIG. 8. The configuration in FIG. 9 is the same as the configuration in FIG. 7, except for the absence of the lower frame 150 below the mold 50. Thus, the description thereof will be omitted. In the configuration shown in FIG. 7, when the external force is applied to a specific portion of the front window 40 as shown in FIG. 8, the mold 50 can move down. Thus, no stress will be applied to the liquid crystal display panel.

However, in the configuration shown in FIG. 9, the liquid crystal display panel and the backlight are supported only by the transparent adhesive layer 45 interposed between the front window 40 and the liquid crystal display panel. In this case, the peeling stress is constantly applied to the transparent adhesive layer 45. Thus, there is a problem that when any vibration or impact is applied to the liquid crystal display device, the liquid crystal display panel and the backlight are peeled off from the transparent adhesive layer 45.

Figure 10:
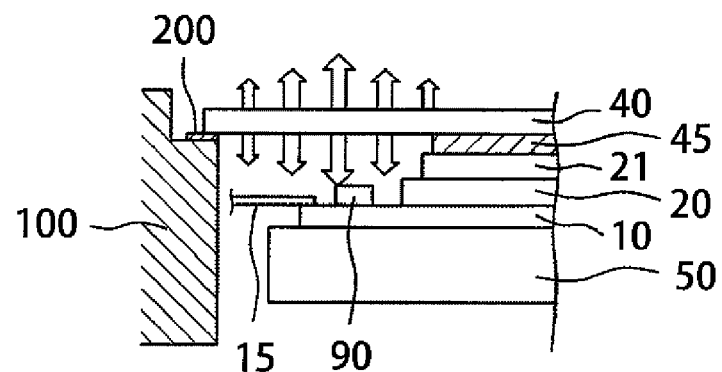
FIG. 10 is a cross-sectional view showing a problem of FIG. 9.

The white arrow shows the amplitude of the front window 40 to which vibration is applied from outside. As shown in FIG. 10, when a vibration is applied to the front window 40, not only a force to peel the liquid crystal display panel and the backlight downward from the front window 40 but also a force to peel the front window 40 upward from the housing 100 is generated. The upward peeling force leads to a risk that the front window 40 will remove from the housing 100, with only the adhesive material 200 supporting between the housing 100 and the front window 40.

FIG. 1 is a cross-sectional view showing the present invention that solves the above problems. In FIG. 1, the liquid crystal display panel is placed on the mold 50, in which a cushion material 60 is interposed between the liquid crystal display panel and the mold 50. Any material can be used for the cushion material 60 as long as it can absorb impact forces. However, the hardness of the cushion material 60 should be smaller than the hardness of the mold 50. For example, the cushion material 60 can be a one-side adhesive tape. Here, the one-side adhesive tape is used because the liquid crystal display panel and the mold 50 are not bonded to each other. The thickness of the cushion material 60 is preferably 0.1 mm or less.

Because of the cushion material 60 interposed between the liquid crystal display panel and the mold 50, for example, if an external force is applied to the front window 40, the stress is absorbed by the cushion material 60. As a result, no stress is concentrated in the liquid crystal display panel, particularly in the portion of only the TFT substrate 10, preventing the liquid crystal display panel from being cracked.

Another feature of FIG. 1 is in that the mold 50 has a peripheral wall portion 51, and that an end of the peripheral wall portion 51 is bonded to the front window 40 with the adhesive material 200 interposed therebetween. FIG. 2 is a cross-sectional view along the line A-A in FIG. 1. As shown in FIGS. 1 and 2, the mold 50 is bonded to the front window 40 by the adhesive material 200 provided at the upper end of the peripheral wall portion 51, thereby supporting the mold 50 itself. The liquid crystal display panel is bonded to the front window 40 with the transparent adhesive layer 45 interposed therebetween.

As describe above, the weight of the mold 50 is supported by the adhesive material 200, and the weight of the liquid crystal display panel is supported by the transparent adhesive layer 45. On the other hand, for example, in the conventional example shown in FIG. 10, the weights of the liquid crystal display panel and the mold 50 are both supported by the transparent adhesive layer 45 interposed between the liquid crystal display panel and the front window 40. As a result, the stress on the transparent adhesive layer 45 is high, causing peeling in this portion.

Further, the configuration shown in FIG. 1 is such that the peripheral wall portion 51 of the mold 50 is bonded to the front window 40 by the adhesive material 200 that is provided between the end portion of the front window 40 bonded to the housing 100, and the transparent adhesive layer 45 bonding the front window 40 and the liquid crystal display panel to each other. Thus, if an external vibration is applied to the front window 40, a large amplitude such as that shown in FIG. 10 is unlikely to be generated in the front window 40. As a result, this configuration reduces the possibility that the liquid crystal display panel could be peeled upward from the housing 100 in FIG. 1 due to the external vibration.

Incidentally, FIGS. 1 and 2 do not show the lower polarization plate 11, which are cross-sectional views of the peripheral portion of the mold 50 in which the polarization plate 11 is hidden by the cushion material 60 or the mold 50. In FIG. 1, the thickness of each of the TFT substrate 10 and the counter substrate 20 in the liquid crystal display panel is 0.15 mm. The thickness of the polarization plate is 0.13 mm. The thickness of the transparent adhesive layer 45 is 0.1 mm. Further, the front window 40 is formed from acrylic and has a thickness of 0.5 mm.

Figure 11:
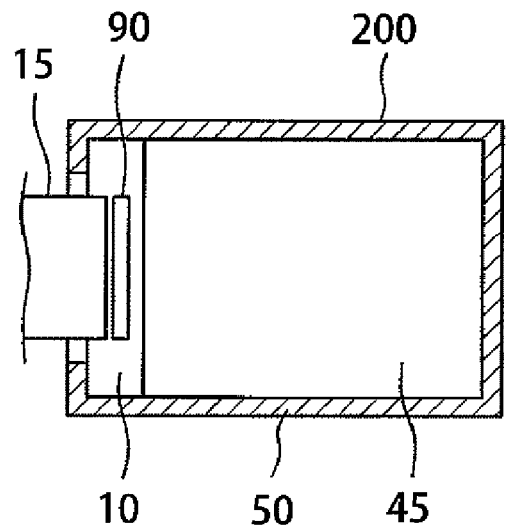
FIG. 11 is an example showing the state in which an adhesive material is provided in a peripheral wall portion of a mold, according to the present invention.

FIG. 11 is a top view showing a state in which the liquid crystal display panel is placed on the mold 50, in which the housing 100 and the front window 40 are removed from FIG. 1. The liquid crystal display panel is placed on the step portion of the mold 50 (not shown) with the cushion material 60 (not shown) interposed therebetween. The adhesive material 200 for bonding the mold 50 to the front window 40 is provided on the peripheral wall portion 51 of the mold 50. On the surface of the liquid crystal display panel, there is shown the transparent adhesive layer 45 that is provided on the upper polarization plate 21. The driver IC 90 and the flexible wiring substrate 15 are attached to the portion of only the TFT substrate 10.

In FIG. 11, the mold 50 is bonded to the front window 40 (not shown) by the adhesive material 200 provided to the upper portion of the peripheral wall portion 51 of the mold 50. While the liquid crystal display panel is bonded to the front window 40 with the transparent adhesive layer 45 interposed therebetween. In this way, the mold 50 in which the backlight is housed, and the liquid crystal display panel are individually attached to the front window 40.

Figure 12:
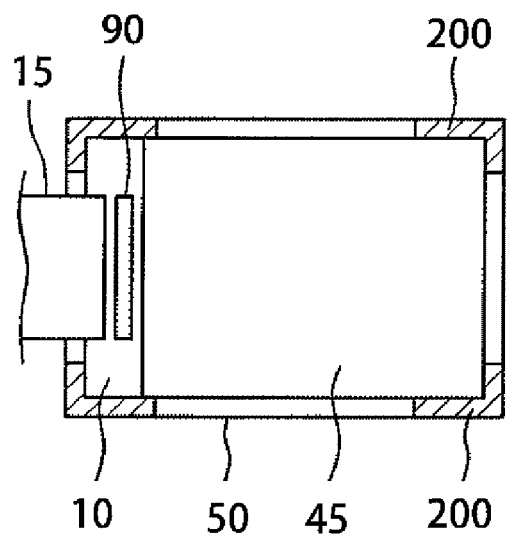
FIG. 12 is another example showing the state in which the adhesive material is provided in the peripheral wall portion of the mold, according to the present invention.

FIG. 12 is a top view showing another state in which the mold 50 is placed on the liquid crystal display panel, in which the housing 100 and the front window 40 are removed from FIG. 1. The configuration is the same as the configuration in FIG. 11, except for the adhesive material 200 provided on the peripheral wall portion 51 of the mold 50. Thus, the description thereof will be omitted. In FIG. 12, the adhesive material 200 is bonded only to corner portions, instead of the entire upper periphery of the mold 50.

The operation may be difficult when the adhesive material 200 is bonded to the entire periphery of the peripheral wall portion 51 of the mold 50. For this reason, the area to which the adhesive material 200 is bonded is determined by taking into account the adhesion force between the mold 50 and the front window 40, as well as the efficiency of the operation. For example, various combinations such as two corner portions and short sides can be considered as the area to which the adhesive material 200 is bonded.

In the example of FIG. 1, the cushion material 60 is interposed between the liquid crystal display panel and the mold 50. The cushion material 60 helps prevent the TFT substrate 10 from being cracked. As another example of this embodiment, a space may be formed between the TFT substrate 10 and the mold 50, instead of using the cushion material 60. In this case also, the liquid crystal display panel is supported to the front window 40 by the transparent adhesive layer 45, and the mold 50 is supported to the front window 40 by the adhesive material 200.

In the configuration in which the space is formed between the liquid crystal display panel and the lower frame 150, when an external force is applied to a portion of the front window 40, the liquid display panel can move down because of the space between the liquid crystal display panel and the mold 50. Thus, no stress occurs in the liquid crystal display panel. As a result, it is possible to prevent the TFT substrate 10 from being cracked. The width of the space is preferably 0.1 mm or more.

As described above, according to this embodiment, it is possible to prevent the crack in the liquid crystal display panel, preventing the liquid crystal display panel from removing from the front window 40, and also preventing the liquid crystal display panel including the front window from removing from the housing 100.

Second Embodiment

Figure 13:
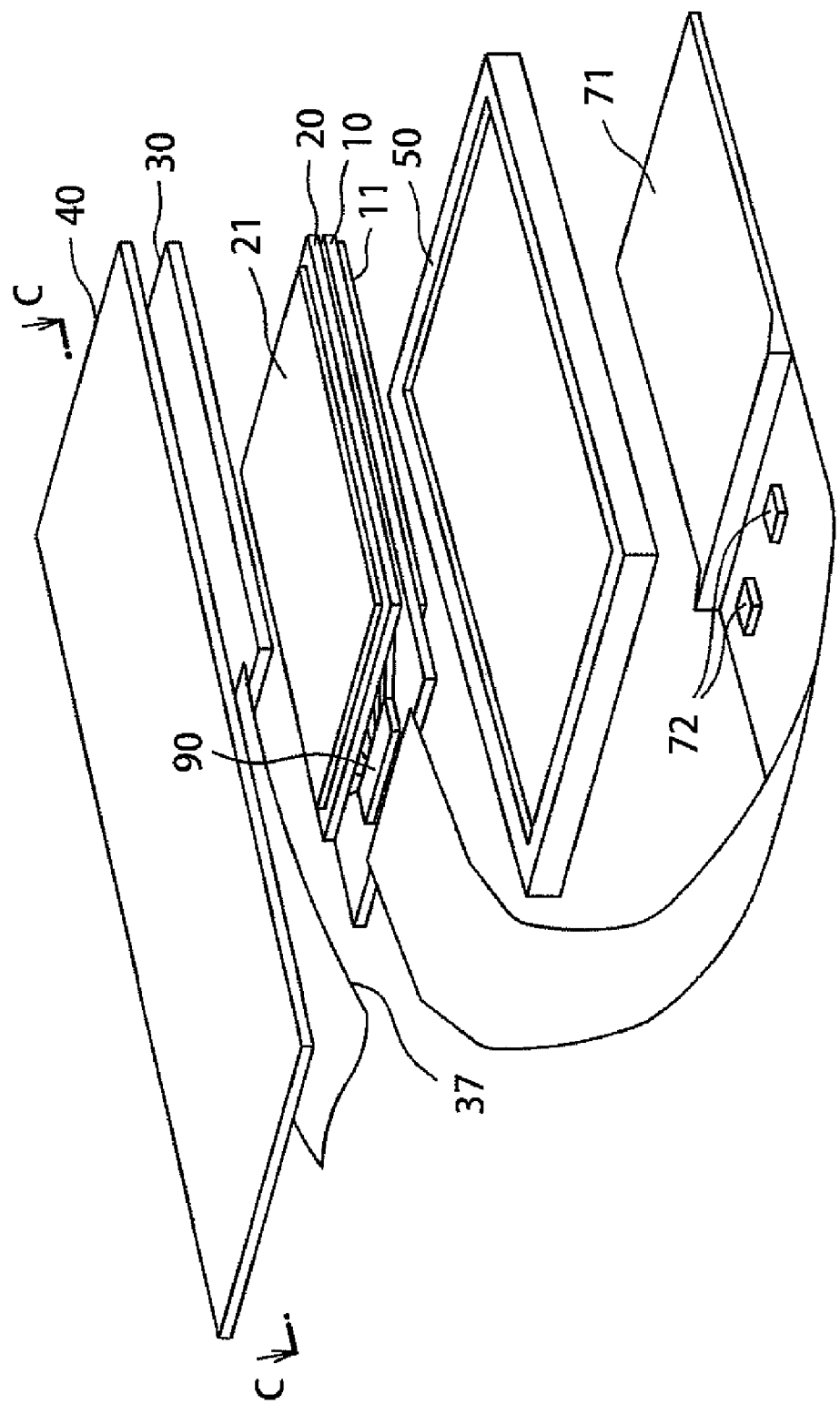
FIG. 13 is an exploded perspective view of a liquid crystal display device to which a second embodiment is applied.
Figure 14:
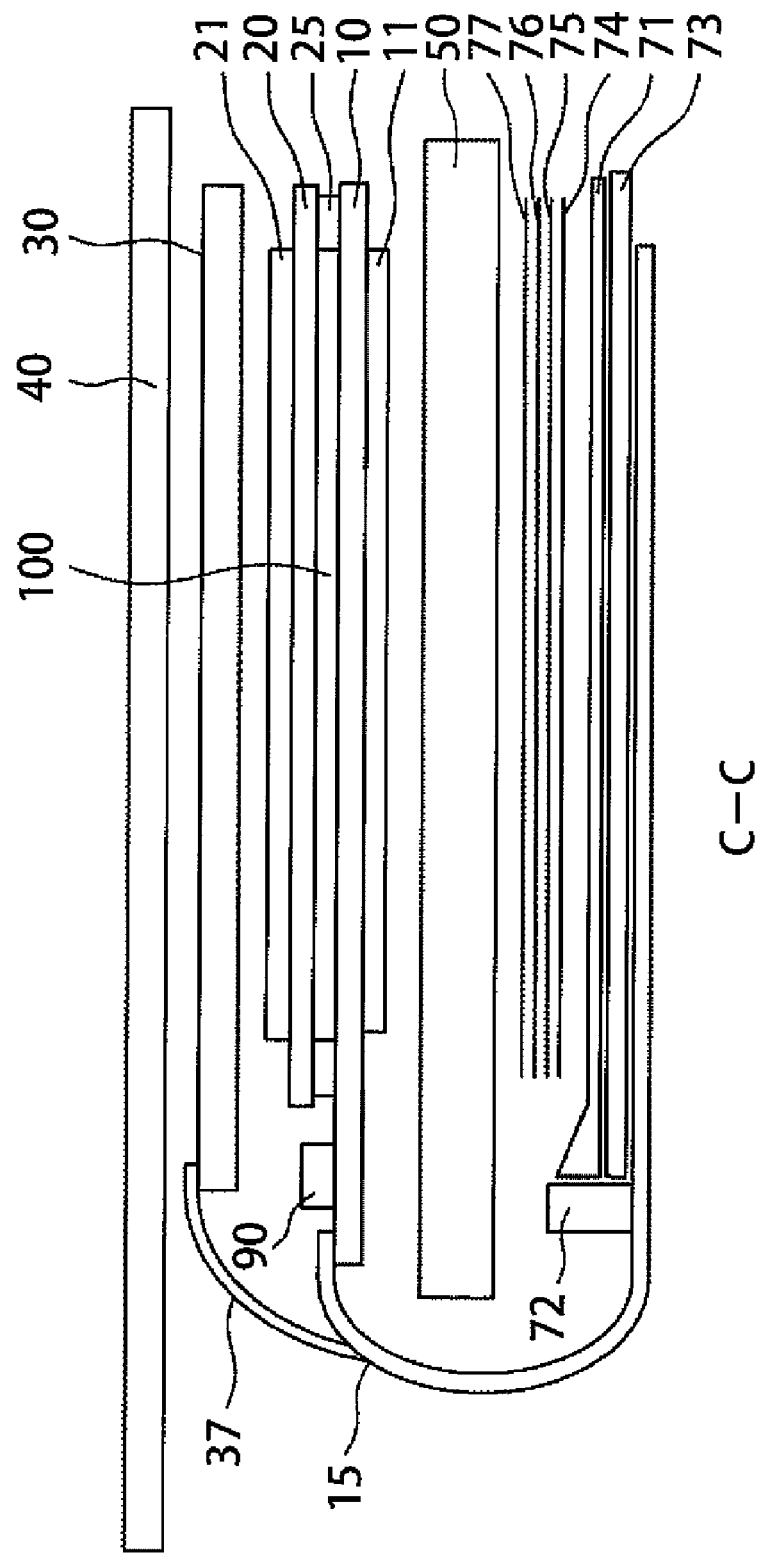
FIG. 14 is an exploded perspective view of the liquid crystal display device to which the second embodiment is applied.

FIG. 13 is an exploded perspective view of a liquid crystal display panel to which a second embodiment is applied. FIG. 14 is an exploded cross-sectional view along the line C-C in FIG. 13. The second embodiment is an example in which the present invention is applied to a liquid crystal display device with a touch panel 30 interposed between the front window 40 and the liquid crystal display panel.

In FIG. 13, the touch panel 30 is inserted between the liquid crystal display panel and the front window 40. In this embodiment, the touch panel 30 is formed from glass and has a thickness of 0.5 mm. A touch-panel flexible wiring substrate 37 is mounted to the touch panel 30, to provide a power input to the touch panel 30 and to provide a signal output from the touch panel 30.

FIG. 14 is an exploded cross-sectional view along the line C-C in FIG. 13. The configuration is the same as the configuration in FIG. 4, except for the touch panel 30 interposed between the liquid crystal display panel and the front window 40. The touch panel 30 is formed a little larger than the counter substrate 20 of the liquid crystal display panel. The touch panel 30 is attached to the upper polarization plate 21 of the liquid crystal display panel by an adhesive layer 35. In this embodiment, for example, an acrylic UV curable resin is used for the adhesive layer 35. The UV curable resin, which is initially liquid, is applied and cured by ultraviolet rays to bond the upper polarization plate 21 and the touch panel 30 to each other. In this way, it is possible to ensure that there are no air bubbles between the upper polarization plate 21 and the touch panel 30.

The transparent adhesive layer 45 is used for the bonding between the touch panel 30 and the front window 40. In this embodiment, the adhesive layer 35 is used between the touch panel 30 and the liquid crystal display panel, and the transparent adhesive layer 45 is used between the touch panel 30 and the front window 40. However, the present invention is not limited to the above example. The adhesive layer 35 and the transparent adhesive layer 45 can be replaced with each other. It is also possible to use the transparent adhesive layer 45 or the adhesive layer 35 for the both sides. The selection between the transparent adhesive layer 45 and the adhesive layer 35 is made by taking into account the efficiency of the assembling operation as well as reproduction.

Figure 15:
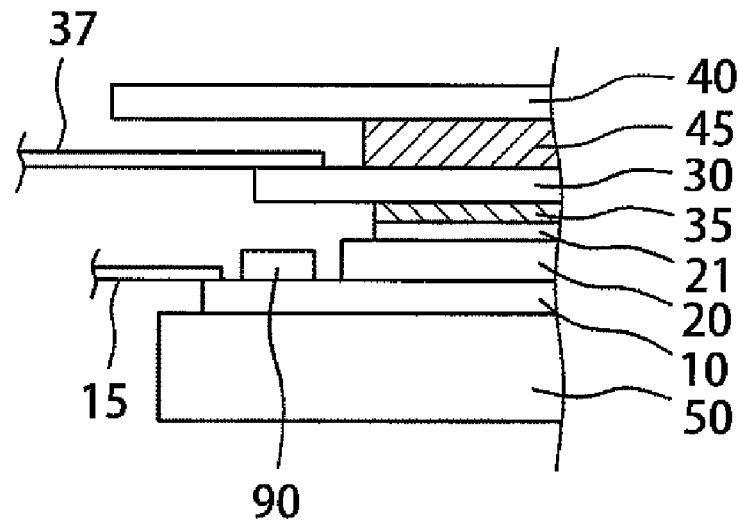
FIG. 15 is a partial cross-sectional view of the long side of the liquid crystal display device to which the second embodiment is applied.

FIG. 15 is a partial cross-sectional view in the long axis direction of the assembled liquid crystal display device shown in FIG. 14. FIG. 15 is the same as FIG. 5 in the first example, except that the touch panel 30 and the touch-panel flexible wiring substrate 37 are interposed between the liquid crystal display panel and the front window 40. Here, the thickness of the transparent adhesive layer 35 is 0.05 mm. The touch panel 30 is formed from glass and has a thickness of 0.5 mm. Further, the touch panel 30 is bonded to the upper polarization plate of the liquid crystal display panel by the UV curable transparent adhesive layer 35.

Figure 16:
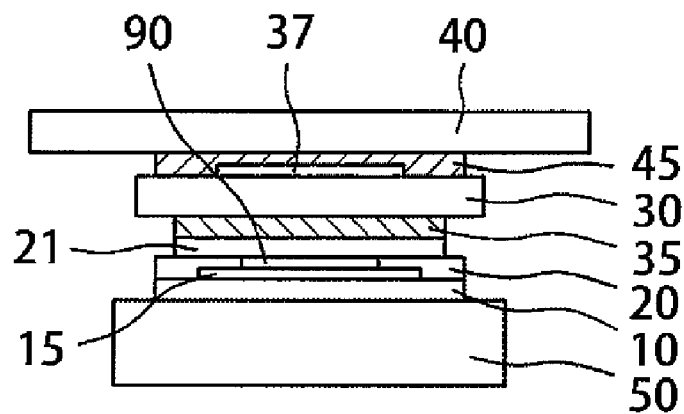
FIG. 16 is a cross-sectional view of the short side of the liquid crystal display device to which the second embodiment is applied.

FIG. 16 is a side view in the short side direction of the assembled liquid crystal display device shown in FIG. 14. FIG. 16 is the same as FIG. 6 in the first embodiment, except that the touch panel 30 and the touch-panel flexible wiring substrate 37 are interposed between the liquid crystal display panel and the front window 40. Thus, the description thereof will be omitted.

Figure 17:
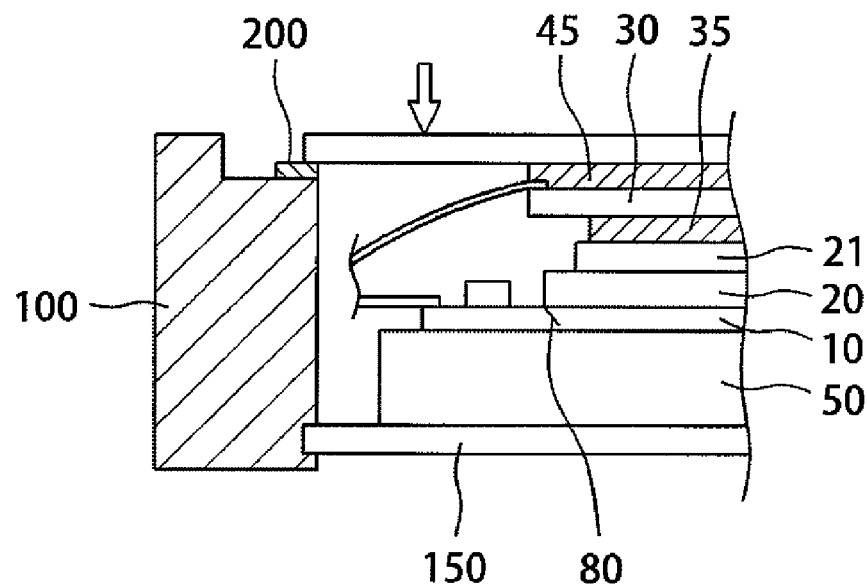
FIG. 17 is a cross-sectional view of the conventional example, which shows a problem occurring when the liquid crystal display device to which the second embodiment is applied is housed in the housing.

FIG. 17 shows a conventional example, in which the liquid crystal display panel, the backlight, and the like, which are shown in FIG. 15 or 16, are housed in the housing 100. Similarly to the first embodiment, the mold 50 is placed on the lower frame 150 integrally formed with the housing 100. In this case also, when an external force is applied to a portion of the front window 40, the stress is concentrated at the boundary between the portion of only the TFT substrate 10 and the portion in which the TFT substrate 10 and the counter substrate 20 overlap with each other. As a result, the crack 80 is generated in the TFT substrate 10 at the boundary region, which is the same as described in the first embodiment.

Figure 18:
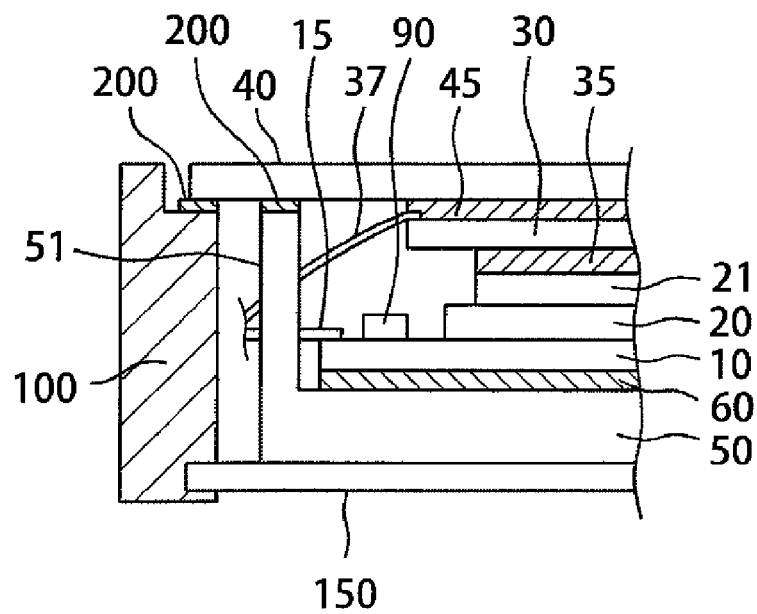
FIG. 18 is a cross-sectional view of the liquid crystal display device of the second embodiment to which the present invention is applied.

FIG. 18 is a partial cross-sectional view in the long axis direction showing the configuration of the present invention to prevent the crack 80 in FIG. 17. In FIG. 18, the cushion material 60 is interposed between the liquid crystal display panel and the lower frame 150 integrally formed with the housing 100. The cushion material 60 can be the same material as used in the first embodiment. The cushion material 60 serves as a cushion to reduce the stress on the liquid crystal display panel, preventing the TFT substrate 10 of the liquid crystal display panel from being cracked.

Further, in FIG. 18, the peripheral wall portion 51 is formed in the mold 50. The adhesive material 200 is provided at the upper end of the peripheral wall portion 51, in which the mold 50 and the front window 40 are bonded to each other. In this way, the mold 50 is directly supported by the front window 40. The transparent adhesive layer 45 between the touch panel 30 and the front window 40 can only support the liquid crystal display panel. Thus, the load on this portion is reduced, thereby reducing the risk of the peeling of the transparent adhesive layer 45. Further, as the peripheral wall portion 51 of the mold 50 is bonded to the front window 40, when a vibration is applied to the liquid crystal display device, it is possible to suppress the amplitude of the vibration of the front window 40.

As described above, also in the configuration in which the touch panel 30 is interposed between the liquid crystal display panel and the front window 40, it is possible to prevent the crack 80 of the TFT substrate 10 by providing the cushion material 60 between the liquid crystal display panel and the lower frame 150 integrally formed with the housing 100. In addition, the peripheral wall portion 51 is formed in the mold 50, which is bonded to the front window 40 by the adhesive material 200. In other words, the mold 50 in which the backlight is housed is not supported by bonding of the transparent adhesive material 200. This reduces the load of the transparent adhesive material 200, leading to a reduction in the risk of peeling of the transparent adhesive material 200. In this embodiment, the weight of the touch panel 30 is added, so that the effect of the present invention is more pronounced than that in the first embodiment.

In the second embodiment described above, the cushion material 60 is interposed between the liquid crystal display panel and the lower frame 150 integrally formed with the housing 100. However, as described in the first embodiment, the effect of the present invention can be obtained also in the configuration in which the touch panel 30 is interposed between the front window 40 and the liquid crystal display panel, as well as the configuration in which the space is formed between the liquid crystal display panel and the lower frame 150 integrally formed with the housing 100 without interposing the cushion material 60 therebetween.

What is claimed is:

1. A liquid crystal display device comprising:
a mold in which a backlight is housed;
a liquid crystal display panel provided on the mold;
a front window bonded on the liquid crystal display panel; and
a housing in which the front window, the liquid crystal display panel, and the mold are provided,
wherein the front window is bonded to the housing,
wherein the mold has a peripheral wall portion that is bonded to the front window, and
wherein a cushion material is interposed between the liquid crystal display panel and the mold, in which the liquid crystal display panel and the mold are not bonded to each other.

2. The liquid crystal display device according to claim 1, wherein the cushion material is a one-side adhesive tape.

3. A liquid crystal display device comprising:
a mold in which a backlight is housed;
a liquid crystal display panel provided on the mold;
a front window bonded on the liquid crystal display panel; and
a housing in which the front window, the liquid crystal display panel, and the mold are provided,
wherein the front window is bonded to the housing,
wherein the mold has a peripheral wall portion that is bonded to the front window, and
wherein a space is formed between the liquid crystal display panel and the mold.

4. A liquid crystal display device comprising:
a mold in which a backlight is housed;
a liquid crystal display panel provided on the mold;
a touch panel bonded on the liquid crystal display panel;
a front window bonded on the touch panel; and
a housing in which the front window, the liquid crystal display panel, and the mold are provided,
wherein the front window is bonded to the housing,
wherein the mold has a peripheral wall portion that is bonded to the front window, and
wherein a cushion material is interposed between the liquid crystal display panel and the mold, in which the liquid crystal display panel and the mold are not bonded to each other.

5. The liquid crystal display device according to claim 4, wherein the cushion material is a one-side adhesive tape.

6. A liquid crystal display device comprising:
a mold in which a backlight is housed;
a liquid crystal display panel provided on the mold;
a touch panel bonded on the liquid crystal display panel;
a front window bonded on the touch panel; and a housing in which the front window, the liquid crystal display panel, and the mold are provided,
wherein the front window is bonded to the housing,
wherein the mold has a peripheral wall portion that is bonded to the front window, and
wherein a space is formed between the liquid crystal display panel and the mold.

* * * * *